R. J. ROGERS.
SAFETY TUG HOLDER.
APPLICATION FILED AUG. 11, 1911.
1,049,270.
Patented Dec. 31, 1912.
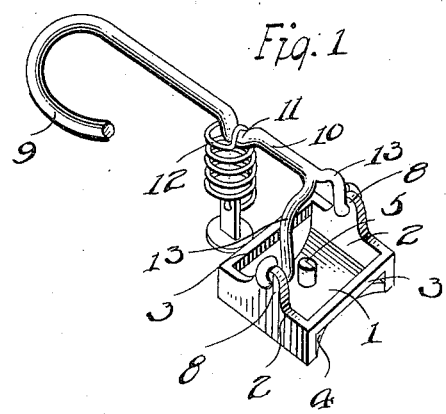
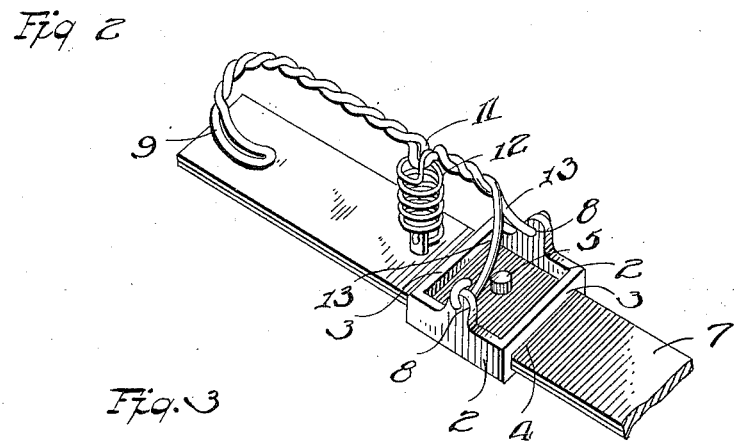
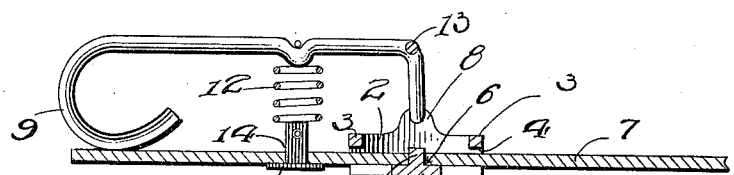
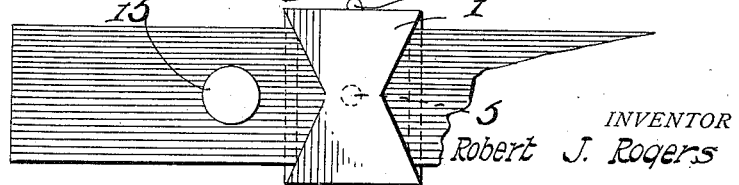
WITNESSES
INVENTOR
Robert J. Rogers
By E. E. Vrooman, Attorney.

UNITED STATES PATENT OFFICE.

ROBERT J. ROGERS, OF CALLAWAY, MINNESOTA.

SAFETY TUG-HOLDER.

1,049,270.      Specification of Letters Patent.      Patented Dec. 31, 1912.

Application filed August 11, 1911. Serial No. 643,573.

*To all whom it may concern:*

Be it known that I, ROBERT J. ROGERS, a citizen of the United States of America, residing at Callaway, in the county of Becker and State of Minnesota, have invented certain new and useful Improvements in Safety Tug-Holders, of which the following is a specification, reference being had therein to the accompanying drawing.

This invention relates to harness hooks and the principal object of the same is to provide a hook having a spring connected with the shank so that the bill will be held in a position to prevent an article engaged by the hook from accidentally becoming detached.

In constructing this hook it will be understood that minor changes in details of construction and design may be made without departing from the invention.

In the accompanying drawings, I have shown two methods of constructing the hook these being the preferred methods.

In the drawings:—Figure 1 is a perspective view of the improved hook. Fig. 2 is a perspective view of a slightly modified form of hook. Fig. 3 is a vertical section taken through the hook shown in Fig. 1. Fig. 4 is a bottom plan view of the hook.

Referring to the accompanying drawings by numerals it will be seen that the hook comprises a base having a flat bottom 1 and walls 2 and 3, the walls 3 being provided with slots 4 and the bottom being cut away as shown in Fig. 4. A pin 5 is mounted upon the central portion of the bottom 1 and is adapted to protrude through an opening 6 in a strap 7 so that the base will be prevented from moving upon the strap. The walls 2 are each provided with a pivot ear 8, the pivot ears being in alinement.

The jaw is formed from a length of metal which has one end portion bent to form the bill 9 and has its intermediate portion 10 which forms a shank crimped to form a seat 11 in which a spring 12 is mounted. The remaining portion is split longitudinally to form the arms 13 which are bent from the shank in opposite directions and then carried parallel and pivotally mounted in openings formed through the pivot ears 8. If desired the jaw may be formed from a length of metal which is bent intermediate its length and twisted as shown in Fig. 2, the ends of the metal being spread apart and passed through the openings formed in the pivot ears 8 to pivotally mount the jaw. A pin 14 having an enlarged head 15 is passed through the strap 7 and one end of the spring 12 is passed through an opening formed in the pin 14 so that the spring will be connected with the strap and normally hold the bill 9 in engagement with the strap.

When using this device it is mounted upon the strap as shown in Figs. 2 and 3 with the bill normally held in engagement with the strap so that an article engaged by the bill will be prevented from accidentally becoming detached. When it is desired to remove the article the jaw is raised against the tension of the spring and the article removed. When the jaw is released the spring returns it to the normal position.

What I claim is:—

A base plate, a hook pivotally connected with said base plate, said hook formed from a single strand of wire, said strand bent intermediate its ends and forming parallel strands, said parallel strands extending for a determined distance and being wound about each other for forming a durable body portion and terminating in outwardly bowed arms, said base plate provided with a plurality of side walls, said side walls provided with pivot ears, said bowed arms pivotally mounted upon said ears, the free end of said hook bent to form a bill for holding an article, said hook crimped intermediate its ends to form a seat, a spring, said spring being detachably secured to said seat and securing means carried by the other end of said spring.

In testimony whereof I hereunto affix my signature in presence of two witnesses.

ROBERT J. ROGERS.

Witnesses:
FRANK MURPHY,
HENRY THOMPSON.

Copies of this patent may be obtained for five cents each, by addressing the "Commissioner of Patents, Washington, D. C."